(12) United States Patent
Sherwin

(10) Patent No.: US 7,410,550 B2
(45) Date of Patent: Aug. 12, 2008

(54) FLEXIBLE INSULATING SLEEVE

(76) Inventor: Michael J. Sherwin, 4081 W. 150th St., Cleveland, OH (US) 44135

( * ) Notice: Subject to any disclaimer, the term of this patent is extended or adjusted under 35 U.S.C. 154(b) by 784 days.

(21) Appl. No.: 10/733,596

(22) Filed: Dec. 11, 2003

(65) Prior Publication Data

US 2005/0126651 A1 Jun. 16, 2005

(51) Int. Cl.
B65H 81/00 (2006.01)
B32B 37/00 (2006.01)
(52) U.S. Cl. ................................ 156/190; 156/195
(58) Field of Classification Search .............. 156/184, 156/190, 192, 195
See application file for complete search history.

(56) References Cited

U.S. PATENT DOCUMENTS

| | | | |
|---|---|---|---|
| 4,282,284 A | 8/1981 | George | |
| 4,443,212 A | 4/1984 | Mochizuki | |
| 4,676,253 A | 6/1987 | Newman et al. | |
| 4,735,213 A | 4/1988 | Shirasaki | |
| 4,821,734 A | 4/1989 | Koshino | |
| 4,836,080 A | 6/1989 | Kite, III et al. | |
| 4,872,461 A | 10/1989 | Miyawaki | |
| 4,929,478 A * | 5/1990 | Conaghan et al. | 428/35.1 |
| 5,048,533 A | 9/1991 | Muz | |
| 5,111,826 A | 5/1992 | Nasiff | |
| 5,152,296 A | 10/1992 | Simons | |
| 5,218,962 A | 6/1993 | Mannheimer et al. | |
| 5,308,919 A | 5/1994 | Minnich | |
| 5,309,916 A | 5/1994 | Hatschek | |
| 5,316,008 A | 5/1994 | Suga et al. | |
| 5,385,149 A | 1/1995 | Chang et al. | |
| 5,413,149 A | 5/1995 | Ford et al. | |
| RE35,122 E | 12/1995 | Corenman et al. | |
| 5,582,179 A | 12/1996 | Shimizu et al. | |
| 5,603,358 A | 2/1997 | Lepoutre | |
| 5,649,543 A | 7/1997 | Hosaka et al. | |
| 5,743,268 A | 4/1998 | Kabal | |
| 5,766,130 A | 6/1998 | Selmonosky | |
| 5,810,723 A | 9/1998 | Aldrich | |
| 5,843,542 A * | 12/1998 | Brushafer et al. | 428/36.1 |
| 5,964,701 A | 10/1999 | Asada et al. | |

(Continued)

FOREIGN PATENT DOCUMENTS

WO WO 95/13495 5/1995

OTHER PUBLICATIONS

Cleveland Laminating Spec. 6210, Foil/Fabric, Dec. 2002.

(Continued)

*Primary Examiner*—Jeff H. Aftergut

(57) ABSTRACT

The present invention relates to flexible cylindrical sleeves for use in protecting wires or conduits from excess heat and/or abrasion. In particular, the present invention provides a flexible sleeve made of multiple bands that are continuously spirally wrapped around each other to form a tube of any desired length. The sleeve generally includes at least two bands, an outer band and an inner band. The outer band and the inner band are laminates in that each is formed of multiple layers. The outer band includes an outer layer of metal foil and the inner band has an innermost layer of woven heat resistant fabric. In another embodiment, one or more additional bands may be wrapped between the inner band and the outer band depending upon the specific application in which the sleeve will be used.

17 Claims, 2 Drawing Sheets

U.S. PATENT DOCUMENTS

| | | | |
|---|---|---|---|
| 6,022,321 | A | 2/2000 | Amano et al. |
| 6,045,884 | A | 4/2000 | Hess et al. |
| 6,178,343 | B1 | 1/2001 | Bindszus et al. |
| 6,334,065 | B1 | 12/2001 | Al-Ali et al. |
| 6,334,850 | B1 | 1/2002 | Amano et al. |
| 6,340,510 | B2 | 1/2002 | Hess et al. |
| 6,887,543 | B1 * | 5/2005 | Louart et al. ............... 428/36.9 |

OTHER PUBLICATIONS

Cleveland Laminating Spec. 6263, Foil/Fabric, Dec. 2002.

Cleveland Laminating Spec. CLC 275, Metallized Polyester/Polyethylene, Sep. 2003.

Cleveland Laminating Spec. CLC 448, Foil/Polyethylene, Sep. 2003.

Pin Quest Spec. FSP7, Foil/Scrim/Polyethylene, undated.

Amatex Spec. G19P33-31, Premium Fiberglass Fabric, undated.

Bentley Harris, Therm-L-Wrap, undated.

Bentley Harris, Therm-L-Lite FG, Seamless Aluminum Finished Lightweight Fiberglass Sleeving, undated.

* cited by examiner

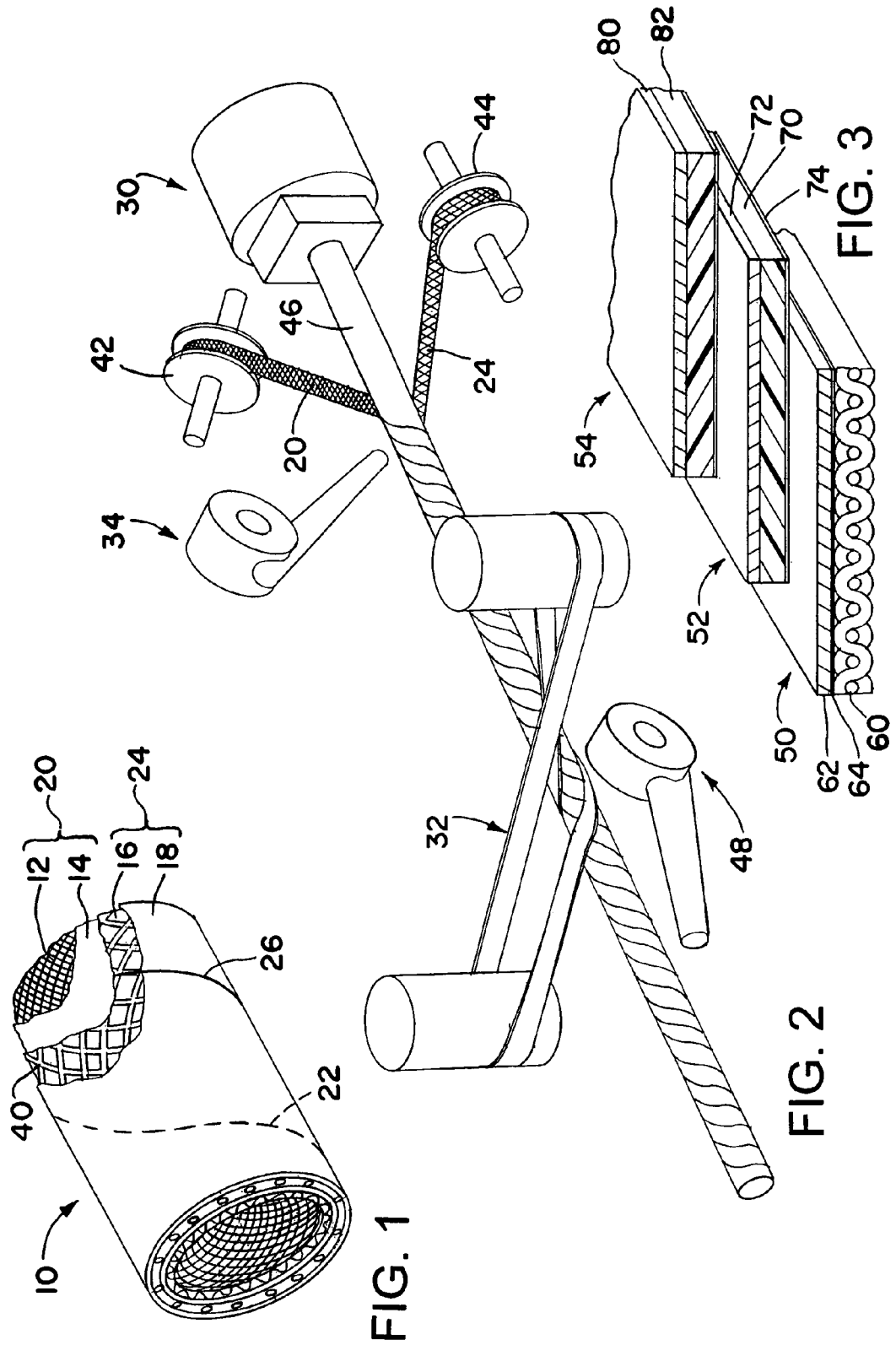

US 7,410,550 B2

FLEXIBLE INSULATING SLEEVE

FIELD OF THE INVENTION

The present invention relates to flexible cylindrical sleeves used to protect wires or conduits from excess heat or abrasion, or both.

BACKGROUND OF THE INVENTION

Several types of products for protecting conduits or wires from heat or abrasion, or both heat and abrasion, are known. In many applications the sleeve needs to be flexible to allow for installation over pipes or wires that are not straight or that may change shape during use. One exemplary application is protecting wires and piping around an internal combustion engine. One product for this use is sold by Federal-Mogul Systems Protection Group under the name Therm-L-Wrap. This product is formed from a woven fiberglass base layer with an outer layer of aluminum foil laminated to the fiberglass. The tube is slit lengthwise, and a flap coated with an adhesive extends from one edge of the slit to seal the seam once the sleeve has been place around the item to be protected and the opposite edges of the sleeves have been brought together. Another form of this sleeve is manufactured by folding an aluminum coated fiberglass strip in half lengthwise and stitching along the open edge. This sleeve and the previous one can open along the joined edges, resulting in a loss of protection. A third, more expensive, product by the same manufacturer is called Therm-L-Lite FG. This product uses a one-piece, substrate of fiberglass braided to form a tube with an outer layer of an aluminum heat-seal film adhesively bonded to it. This product is not vulnerable to coming open because it has no longitudinal seam, but it is more expensive than the previous two. A need remains in the market for sleeves that resist coming apart in use, that are equally or more effective at insulating from heat and/or abrasion and that are less expensive to manufacture.

SUMMARY OF THE INVENTION

The present invention provides a flexible sleeve made of multiple bands that are continuously spirally wrapped around each other to form a tube of any desired length. The outer band and the inner band are laminates in that each is formed of multiple layers. The outer band includes an outer layer of metal foil and the inner band has an innermost layer of woven heat resistant fabric. One or more additional bands may be wrapped between the inner band and the outer band. Each band may have one or more layers. In an exemplary inner band, a layer of metal foil adheres to the innermost fabric. The inner band is thus formed of a laminate pair: the fabric layer and the inner foil layer. An exemplary outer band includes a layer of foil and a scrim of heat resistant fibers adhered to its inside surface. A layer of Mylar or comparably tough, heat resistant polymer may be substituted for the scrim. The outer band is thus formed of an outer laminate pair: the foil layer and a scrim or suitable polymer layer. The sleeve is made by joining the inner and outer bands using a spiral wrapping technique. The inner band is supplied in a strip and wrapped in a spiral with its edges closely abutting each other. The outer band is also supplied in a strip, with the scrim or polymer side facing the outside of the inner band. The outer band is wound on a different lead from the inner band, that is, the outer band is positioned so that the spiral seam of the inner band lies under the axial centerline of the outer band. This positions equal amounts of the scrim or polymer spanning the joint between turns of the inner band. Because the inner band and the outer band are bonded to each other and on different leads, they hold the sleeve against unwinding or tearing.

BRIEF DESCRIPTION OF THE DRAWINGS

FIG. 1 is a perspective illustration of a sleeve made following the teachings of the present invention, partially cutaway.

FIG. 2 is a schematic illustration of a machine used to manufacture the sleeve of the present invention.

FIGS. 3 and 4 illustrate the use of three bands to make a sleeve following the teachings of the present invention.

DESCRIPTION OF THE INVENTION AND EMBODIMENTS THEREOF

Figure 4:
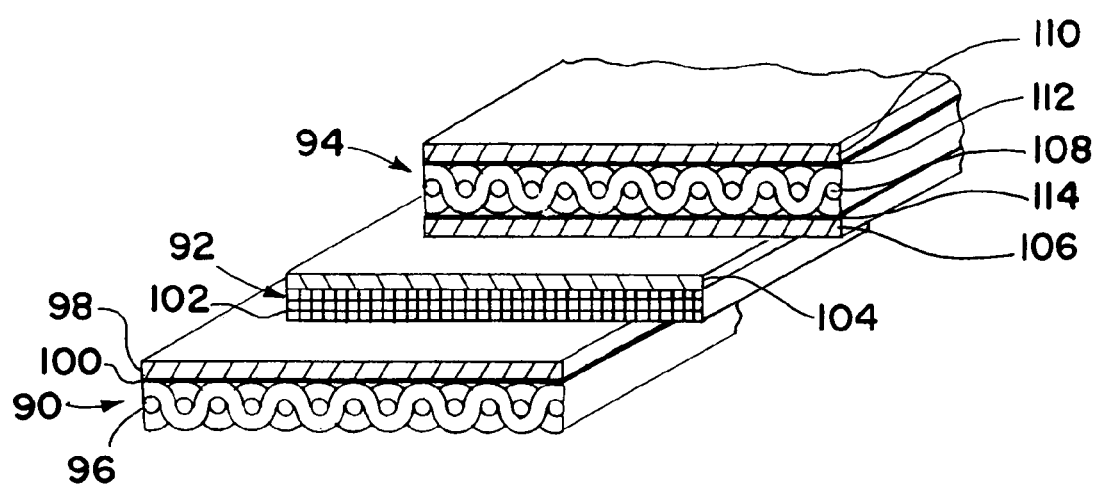

A flexible sleeve 10 made according to the teachings of the present invention is shown in FIG. 1. This sleeve is made of two bands. In this description, the term "layer" is used to describe an individual layer of material. The term "band" is used to describe a web of material that is fed into a spiral winding machine to form a spiral wound sleeve. A band may be made of a single layer or of multiple layers that are pre-attached or bonded to each other.

Starting from the inside, the sleeve 10 has an inner layer 12 of woven fiberglass or other thermally insulating fabric. An inner layer 14 of metal foil overlays the fabric layer 12. A layer 16 of scrim overlays the inner foil layer, and an outer layer 18 of foil overlays the scrim. The fabric layer 12 and inner layer of foil 14 have equal widths and are superimposed on each other and bonded together to form an inner band 20. The spiral line 22 in FIG. 1 shows the seam where one turn of the inner band 20 meets the edge of the succeeding turn of this band.

The scrim layer 16 and the outer foil layer 18 have the same width, and they are superimposed on each other to form an outer band 24. The outer band 24 has the same width as the inner band 20. The scrim layer 16 is bonded to the outer foil layer 18 in a separate, preliminary operation that permanently joins them together, using an adhesive, for example, to form an outer band 24. Thereafter a thermoplastic adhesive (not shown) is optionally applied to the scrim side of the outer band 24. Although the present invention has been described using a scrim layer 16, one of ordinary skill in the art will readily appreciate that a layer of Mylar or comparably tough, heat resistant polymer may be substituted for the scrim.

The lead of the outer band 24 is offset by one half the width of the inner band 24. The succeeding edges of the outer band are shown by the spiral line 26 in FIG. 1. The path lengths of each band 20, 24 for one complete revolution are slightly different because the inner band 20 has a smaller diameter to wrap around than the outer band 24 and therefore advances slightly more in an axial direction with each revolution. In order to accommodate this difference so as to keep the axial spacing between the seams uniform along the length of the sleeve 10, the helix angle of one of the bands 20, 24 may be adjusted. This can produce a sleeve in which opposite longitudinal edges of both bands touch each other while the seams remain centered between each other. For example, the edges 22 of the inner band 20 touch each other to define an inner seam and the edges 26 of the outer band 24 also touch each other. The result is that the edges 22 of the inner band 20 that for its seam run down the centerline of the outer band 24. Alternatively, the bands 20, 24 may be made of different widths or they have the same width, the same helix angle and the edges of the outer band 24 may be slightly spaced from each other. Which technique is used depends on non-technical concerns such as a business requirement to use the same bands to make sleeves of different diameters depending on a customer's needs.

The inner and outer bands 20, 24 are held together with an adhesive or cohesive (not shown). Any suitable adhesive or cohesive may be used including thermoplastic and thermosetting adhesives. If a thermoplastic adhesive is used, the sleeve 10 may be heated before it is wound, causing the layers to adhere to each other as they pass through a winding machine 30 (FIG. 2) and are pressed together by the machine's belt 32. Such a heater 34 is shown schematically in FIG. 2. The heater 34 generally includes a heating element (not shown) and a blower to direct heated air to the bands 20, 24.

As noted, the inner band 20 is formed of a layer 12 of fabric overlaid by a layer 14 of foil. The fabric layer 12 is made of fiberglass woven in a plain weave. One suitable fabric is about 18.5 ounces per square yard (about 56 N/m$^2$) and is commercially available from Amatex Corporation of Norristown, Pa. This fabric is approximately 0.030 inches (about 0.76 mm) thick. Other fabrics may be used so long as they provide good thermal resistance, for example up to about 1000° F. (about 538° C.). Carbon fibers may be used to weave this fabric, or fibers made of ceramic materials may be used. The material selected depends in part on the temperature to which the sleeve will be exposed, as well as the anticipated amount of abrasion to which the sleeve will be subjected. Many suitable materials are known, including various blends of synthetic and naturally occurring materials.

The foil layer 14 of the inner band 20 may be bonded to the fabric layer 12 using the thermoplastic adhesive. In one manner of making the sleeve, this step is performed separately from the winding operation. Once these layers are bonded to form the inner band 20, a separate layer of thermoplastic adhesive is optionally added to the outside of the inner foil layer 14. A suitable foil/fabric combination is available from Cleveland Laminating, 2909 East 79$^{th}$ Street, Cleveland, Ohio 44104, product number 6210. This product meets the weight and thickness descriptions above +/−10%.

As noted above, the outer band 24 may optionally have a layer of adhesive on its inside surface or the inner band 20 may have a layer of adhesive on its outside surface. If an adhesive is used and the sleeve 10 is a two-band sleeve, then only one of the two bands need have adhesive. Alternatively, a cohesive (described below) may be used, in which case the outside of the inner band 20 and the inside of the outer band 24 both require application of the cohesive. Finally, it is contemplated that the sleeve could be made from three or more bands. In this case the adhesive or cohesive may be applied appropriately so as to permanently secure the bands to each other. Three bands used to form a sleeve are illustrated in FIG. 3 and described more fully below.

The inner foil layer 14 of the sleeve illustrated in FIG. 1 is generally between about 0.005 and 0.0005 inches (about 0.013 and 0.09013 cm) thick and generally is approximately 0.001 inches thick. This foil is made of a heat reflecting, flexible metal such as aluminum. The foil layer 14 may also be made of other materials that have the appropriate mechanical and thermal characteristics. The foil, if aluminum may be substantially pure aluminum, or it may be an aluminum alloy.

As noted above, the outer band 24 is also a laminate. The scrim 16 is a relatively open weave material. It has threads 40 arranged in a rectilinear grid about 0.2 inches (about 0.5 cm) apart. The threads 40 are made of glass or other fiber having the necessary mechanical properties. For example, if the sleeve 10 is used to provide thermal and mechanical protection up to about 1000° F. (about 538° C.), the fibers of the scrim 16 must remain strong and flexible at that temperature.

The outer foil layer 18 is made of a material selected according to the same criteria as the inner foil layer 14. Like the inner foil layer 14, the outer foil layer 18 is most commonly aluminum or an aluminum alloy. Typically this layer is between about 0.003 and 0.0003 inches (about 0.008 and 0.0008 cm) thick and generally about 0.0007 inches (about 0.0018 cm) thick. The outer foil layer 18 and scrim layer 16 may be bonded to each other with a polyethylene copolymer which may be approximately 0.00125 inches (about 0.00318 cm) thick.

In production, the sleeve 10 is made by supplying a spool 42 of the inner band 20 and a spool 44 of the outer band 24, both having the same width. The bands 20, 24 are fed to a conventional spiral wrapping machine 30 at a helix angle adjusted to cause the opposite edges of each band to abut each other. The leads of the two laminated bands 20, 24 are offset by one half the width of the laminate. Other offsets could be used, but offsetting the two bands by one half their width assures that there will be an equal width of the outer band 24 on each side of the seam 22 of the inner band 20. This results in each of the two bands 20, 24 reinforcing the seam of the other band. Because the heater 34 preheats and softens the adhesive on the outside of the inner band 20 (or optionally the inside of the outer band 24) the bands 20, 24 stick to each other as they are wound around the mandrel 46 of the winding machine 30. The belt 32 of the winding machine 30 presses the bands 20, 24 together tightly, and as the sleeve 10 cools, the bond between the bands 20 and 24 strengthens.

A thermoplastic adhesive is commonly used in making the sleeve 10 following the teachings of the present invention, but there is no technical reason why adhesives that are activated in other ways could not be used. For example, the outside of the inner band 20 could have a cohesive applied to its outside surface and the inside of the inner band 24 could have a corresponding cohesive applied to it. These cohesives require no activation by heat or otherwise. Instead the two cohesives will bond firmly and immediately to each other when brought into contact, but they generally do not stick to any other material. Alternatively, a pressure sensitive adhesive could be used, with belt 32 of the tube winding machine 30 pressing the bands 20 and 24 into contact to cause bonding between the bands. The heater 34 may be replaced with an ultraviolet light, and the adhesive chosen may be one activated by such light. In effect, any suitable means for sticking one band 20 to the other band 24 may be used, and all such means are comprehended by the term "adhesive" where that term or its cognates are used in the claims of this application.

The heater 34 is shown as directing hot air at the sleeve just as it first wraps around the mandrel 46 of the winding machine 30. This is exemplary only and other arrangements for heating a thermoplastic adhesive may be used. For example, a shroud can be formed to direct hot air along with the length of the bands 20 and 24 between the respective spools 42 and 44 before the bands reach the mandrel 46. As a further alternative, the heater 34 may not be used, but instead an alternate heater 48 may be used. The alternate heater 48 is positioned downstream of the belt 32 of the winding machine 30. The particular position for heating depends on the type of materials used to make the sleeve and the adhesive used to secure the bands to each other.

One sleeve 10 constructed following the teachings of this invention is manufactured using an inner laminated band 20 of fiberglass with a foil layer 14 on one side held in place by a thermoplastic adhesive. The outer laminated band 24 is formed from a fiberglass scrim 16 and an aluminum foil outer layer 18 held together by a polyethylene layer almost twice as thick as the foil outer layer. When these two laminated bands 20 and 24 are wound into a sleeve as described, the result is a sleeve 10 available in any desired length and which may be flattened for shipping. Flattening is possible because the fabric layer 12 and scrim 16 are inherently flexible, and the two foil layers 14 and 18 are relatively thin in comparison to the thickness of the fabric. Because the relatively thick fabric is on the inside, even when the sleeve is flattened the smallest radius of curative of the foil layer 14 is large compared to the thickness of the foil layer 14. This reduces the chances that the foil will tear or break when this sleeve is flattened. The sleeve 10 does not easily come unwrapped or tear. The scrim 16, being bonded across the seam 22 between turns of the inner band 20, prevents separation of that seam. Because the "flat bands are substantially less expensive than the braided tube used in the prior art, the sleeve 10 is less expensive to manufacture than sleeves using a braided substrate.

The sleeve 10 has been described as being formed from two bands 20, 24. The present invention teaches that in some applications it may be advantageous to make the sleeve from three or more bands. In particular, FIGS. 3 and 4 illustrate such embodiments. In the case of three bands, the third band may be placed between the inner and outer bands, with the leads offset by one third of the width of each band. The third band may be advantageous where additional mechanical strength or insulating ability (or both) are desired. Additional bands may also be used. However, each additional band makes the sleeve slightly stiffer, slightly heavier, and slightly more expensive to make. These physical properties may be advantageous or not depending upon the precise application in which the sleeve is to be used. Additional cost generally is not an advantage, but it may be necessary in order to obtain the desired results or performance.

Referring to FIG. 3, the present invention teaches making a sleeve of three bands, an inner band 50, a middle band 52, and outer band 54. These bands are of equal width. The bands are shown greatly enlarged to illustrate the various layers in each band. The thicknesses of the layers are not shown to scale.

The inner band 50 is the same as the inner band 20. It is made of a fabric layer 60 and a foil layer 62 held together by a layer of adhesive 64. The fabric 60 is the same as that used in the fabric layer 12, and accordingly is approximately 0.030 inches (about 0.076 cm) thick. Alternatively, the fabric layer may be 12.8 oz./sq. yd. (about 38.5 n/m$^2$) and have a thickness of about 0.020 inches (about 0.051 cm.). Cleveland Laminating's foil/fabric product 6263 combines glass cloth fabric with a 0.001 in (about 0.002 cm) thick aluminum foil layer. Again actual measurements are expected to be +/−10% of the valves given. The foil layer 62 is between 0.005 and 0.0005 (about 0.013 and 0.0013 cm) inches thick. Therefore, following the teachings of the invention, the inner foil layer 62 may be 0.001 inches (about 0.002 cm) thick, making it $\frac{1}{30}^{th}$ the thickness of the fabric layer (or $\frac{1}{20}^{th}$, if the lighter fabric is used). When the sleeve made of these layers is flattened, the fabric layer folds upon its self and the foil layer must bend around a bend with a radius no less than about 0.030 (about 0.076 cm) inches (or about 0.020) inches (about 0.051 cm). As a result, the stresses in the foil layer are well below the yield point of the foil, making it possible to flatten the sleeve for shipping and yet produce few, if any, tears in the foil.

The middle band 52 shown in FIG. 3 is formed of a layer 70 of polyester with its top surface "metalized." This process forms a very thin layer 72 of aluminum on the surface of the polyethylene. Typically the polyester layer is about 0.001 to 0.005 inches (about 0.002 to 0.013 cm) thick, and the metalized layer 72 is very thin (roughly 0.00048 inches) (about 0.00122 cm), adding insignificantly to the thickness of the band. For example, the band 52 may be Cleveland Laminating's LLC 275 with a thickness of about 0.0017 inches (about 0.0043 cm), +/−10%. The inside surface of the polyethylene layer 70 is coated with an adhesive 74 that will, when the sleeve is made, bond securely to the foil layer on the outside of the inner band 50. Such an adhesive may be TC3, a thermoplastic adhesive, available from Cleveland Laminating, Cleveland, Ohio. Other adhesives are suitable so long as they can be softened sufficiently to form a bond at a temperature below one where the polyester loses its structural integrity and starts to stretch.

The outer band 54 is also a laminate. The outer band 54 includes an upper/outer layer 80 of aluminum which is bonded by a polymeric adhesive (not shown) to a polyethylene layer 82.

Referring to FIG. 4, another embodiment of a three band sleeve is shown having an inner band 90, a middle band 92, and an outer band 94. Like FIG. 3, the bands shown in FIG. 4 are greatly enlarged to illustrate the various layers in each band and the thicknesses of the layers are not shown to scale.

The inner band 90 is similar to inner bands 20 and 50 discussed above. In particular, inner band 90 includes a layer of woven fiberglass 96 or a thermally insulating fabric and layer of metal foil 98. The layer of metal foil 98 (e.g., aluminum) overlays the fabric layer 96. The layer of metal foil 98 and the layer of woven fibergalass 96 are bound together by a layer of adhesive 100. As stated above, Cleveland Laminating's foil/fabric product 6263 is a suitable product for inner band 90.

The middle band 92 is similar to band 24, discussed above. In particular, middle band 92 is made of a scrim layer 102 and a foil layer 104. The scrim layer 102 is a relatively open weave material having threads 40 (shown in FIG. 1) arranged in a rectilinear grid about 0.2 inches (about 0.5 cm) apart. As stated above, the threads 40 are made of glass or other fiber having the necessary mechanical properties. The foil layer 104 is made of a material selected according to the same criteria as the foil layer 98. The foil layer 104 is most commonly aluminum or an aluminum alloy. Typically the foil layer 104 is between about 0.003 and 0.0003 inches (about 0.008 and 0.0008 cm) thick and generally about 0.0007 inches (about 0.0018 cm) thick. The foil layer 104 and scrim layer 102 may be bonded to each other with a polyethylene copolymer which may be approximately 0.00125 inches (about 0.00318 cm) thick.

The outer band 94 is also a laminate. The outer band 94 includes a fabric layer 108 bonded between two layers of foil 106 and 110, as shown in FIG. 4. The foil layer 106 has a thickness of about 0.0007 in. and is manufactured from aluminum or an aluminum alloy. The foil layer 110 has a thickness of about 0.0003 in. and is similarly manufactured from aluminum or an aluminum alloy.

The fabric layer 108 may be a woven fiberglass or other thermally insulating fabric. One suitable fabric for the fabric layer 108 is about 3 ounces per square yard (about 9.1 N/m$^2$) and is commercially available from Amatex Corporation of Norristown, Pa. The fabric is approximately 0.030 inches (about 0.76 mm) thick. Other fabrics may be used so long as they provide good thermal and/or abrasive resistance depending on the specific application. Adhesive layers 112 and 114 are used to permanently bond foil layers 106 and 110 to the fabric layer 108 in a separate preliminary operation prior to the winding process. A suitable adhesive for adhesive layers 112 and 114 must substantially permanently bond the fabric layer 108 and the foil layers 108 and 110 together to form the band 94.

To assemble a sleeve following the teachings of the present invention using a three band sleeve, the inner, middle, and outer bands are fed into a conventional sleeve wrapping machine. The lead of each band is advanced one third the band width as shown in FIGS. 3 and 4. Like the sleeve shown in FIG. 1, the inner, middle, and outer bands are heated before being wrapped. However, it should be understood by one of ordinary skill in the art that multiple layers of bands may need additional heat to activate the adhesive of all the bands of material as the product is designed as a thermal insulator. In that case when the sleeve has emerged from the belts, it is heated by an additional blower 48. The blower 48 is directed in a downstream direction so that the sleeve is hottest shortly after it emerges from the belts and cools as it moves down stream. The heating softens the adhesive and causes the three bands to adhere to each other.

Performing the manufacturing steps in the order described allows the polyester to be successfully wrapped and bonded.

As stated above, various embodiments of the present invention may be more suitable for different applications and/or environments. The embodiments disclosed above have been described in order having an increase in abrasive resistance. The third embodiment (shown in FIG. 4) is particularly well suited for automotive applications due to the sleeve having increased flexibility and abrasive resistance.

Although certain embodiments of the invention have been shown and described, it is obvious that equivalents and modifications will occur to others skilled in the art upon the reading and understanding of the specification. The present invention includes all such equivalents and modifications, and is limited only by the scope of the following claims.

What is claimed is:

1. A method of making an insulating sleeve, comprising the steps of:
   supplying a first band having a metal foil superimposed on a thermally insulating fabric;
   supplying a second band having a metal foil superimposed on a scrim layer;
   winding the first band along a spiral path and overlaying the second band over a seam between adjacent turns of the first band; and
   adhering the first band to the second band.

2. A method of claim 1, wherein the supplying steps include supplying the first and second bands on respective spools to a spiral wrapping machine.

3. A method of claim 1, wherein the winding step includes winding at least the second band such that an edge of the band in one turn abuts an opposite edge of the band in an adjacent turn.

4. A method of claim 1, wherein the winding step includes offsetting the second band from the first band by one half the width of the outer band.

5. A method of claim 1, wherein the winding step includes winding the first band and the second band at different helix angles.

6. A method of claim 1, wherein the winding step includes wrapping the first band around a mandrel of a spiral wrapping machine.

7. A method of claim 1, further comprising the step of heating at least one of the bands to bond the bands together.

8. A method of claim 7, wherein the heating step includes blowing heated air on at least one of the bands.

9. A method of claim 7, further comprising the step of pressing the bands together after heating.

10. A method of claim 7, further comprising the step of pressing the bands together before heating.

11. A method of claim 7, wherein the heating step includes preheating at least one of the bands before the winding step.

12. A method of claim 1, further comprising the step of applying an adhesive to at least one of adjacent outer and inner surfaces of the first and second bands, respectively, to bond the first and second bands together.

13. A method of claim 12, further comprising the step of activating the adhesive.

14. A method of claim 13, wherein the activating step includes heating at least one of the bands.

15. A method of claim 1, further comprising the step of applying a cohesive on both an inner surface of the second band and an outer surface of the inner band to bond the inner and outer bands together.

16. A method of claim 15, further comprising the step of pressing the first and second bands together.

17. A method of claim 1, further comprising the step of flattening the sleeve.

* * * * *